United States Patent
Sundaresan

(10) Patent No.: US 8,537,738 B2
(45) Date of Patent: Sep. 17, 2013

(54) METHOD AND A SYSTEM OF VIDEO MULTICAST SCHEDULING

(75) Inventor: Karthikeyan Sundaresan, Howell, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 14 days.

(21) Appl. No.: 13/287,779

(22) Filed: Nov. 2, 2011

(65) Prior Publication Data

US 2012/0131632 A1 May 24, 2012

Related U.S. Application Data

(60) Provisional application No. 61/414,924, filed on Nov. 18, 2010.

(51) Int. Cl.
*H04H 20/71* (2008.01)
*H04J 3/26* (2006.01)
*H04L 12/28* (2006.01)
*H04L 12/56* (2011.01)
*H04N 7/173* (2011.01)
*H04N 11/02* (2006.01)
*G06F 15/16* (2006.01)
*H04B 3/00* (2006.01)
*H04B 1/66* (2006.01)

(52) U.S. Cl.
USPC ........ 370/312; 370/432; 370/395.4; 370/390; 370/395.52; 725/95; 725/97; 709/231; 375/240.01; 375/257; 375/240

(58) Field of Classification Search
USPC ................ 370/312, 432, 395.4, 390, 395.52; 725/95, 97; 709/231; 375/240.01, 257, 240
See application file for complete search history.

(56) References Cited

U.S. PATENT DOCUMENTS

| 8,223,853 | B2 * | 7/2012 | Vijayan et al. | 375/260 |
| 2010/0296428 | A1 * | 11/2010 | Ho | 370/312 |
| 2011/0274180 | A1 * | 11/2011 | Lee et al. | 375/240.25 |
| 2011/0310910 | A1 * | 12/2011 | Wu et al. | 370/432 |

OTHER PUBLICATIONS

Cai et al., "Scalable modulation for scalable wireless videocast" in IEEE INFOCOM Proceedings, Mar. 2010. (5 pages).
Deb et al., "Real-time video multicast in wimax networks" in IEEE INFOCOM Proceedings, Apr. 2008. (13 pages).
Li et al., "Scalable video multicast in multi-carrier wireless data systems" in Network Protocols, ICNP 2009. 17th IEEE International Conference, Oct. 2009. (5 pages).
She et al., "A framework of cross-layer superposition coded multicast for robust iptv services over wimax" in IEEE WCNC, Apr. 2008, pp. 3139-3144.

\* cited by examiner

*Primary Examiner* — Hoang-Vu A Nguyen-Ba
(74) *Attorney, Agent, or Firm* — Joseph Kolodka

(57) ABSTRACT

Methods and systems for scheduling multicast transmissions that includes scheduling layered data for one or more multicast transmissions across a plurality of sub-channels using multi-resolution modulation. The sub-channels for each transmission may have diverse or uniform capacities. Scheduling includes allocating sub-channels to the layers of the layered data.

16 Claims, 8 Drawing Sheets

METHOD AND A SYSTEM OF VIDEO MULTICAST SCHEDULING

RELATED APPLICATION INFORMATION

This application claims priority to provisional application Ser. No. 61/414,924 filed on Nov. 18, 2010, incorporated herein by reference.

BACKGROUND

1. Technical Field

The present invention relates to video multicasting and, in particular, to scheduling video multicast transmissions in wireless orthogonal frequency division multiplexing networks.

2. Description of the Related Art

Orthogonal frequency division multiple access (OFDMA) has become the preferred air interface technology for next-generation broadband access networks such as 3GPP (Third Generation Partnership Project), LTE (Long Term Evolution), and WiMAX (Worldwide Interoperability for Microwave Access), including both macrocell and femtocell networks. Further, the proliferation of mobile devices has increased the demand for bandwidth intensive video applications and services such as mobile IPTV (Internet Protocol Television) and Video-on-Demand, where multicasting forms an important component.

In OFDMA, each sub-channel available for scheduling is composed of a group of sub-carriers at the physical layer. The permutation of sub-carriers to form a sub-channel has a direct impact on the amount of channel diversity that can be leveraged through scheduling. Selecting sub-carriers in a distributed manner from the entire spectrum averages out and removes channel diversity (referred to as distributed permutation, DP), while grouping them contiguously retains channel diversity (referred to as contiguous permutation, CP).

The multicast rate of transmission on a sub-channel depends on the minimum rate supported by the users in the session on that sub-channel. Note that the channel quality (and hence the rate) of a user varies across sub-channels in CP, while it remains the same in DP. Hence, if the net (sum) rate of a user on a given set of sub-channels is the same in both DP and CP, then the channel diversity in CP will contribute to degrade the multicast rate on individual sub-channels, reducing its performance below that of DP. Thus, the inherent diversity across sub-channels poses a challenge for multicasting in CP.

SUMMARY

A method for scheduling multicast transmissions is shown that includes scheduling layered data for one or more multicast transmissions across a plurality of sub-channels using multi-resolution modulation, where the sub-channels for each respective transmission have diverse capacities. Scheduling includes maximizing an overall utility function using a processor according to a utility metric that considers incremental utility gains and losses for each sub-channel allocation and allocating a number of sub-channels to each of a plurality of layers of the layered data according to the overall utility function.

A method for scheduling multicast transmissions is shown that includes scheduling layered data for one or more multicast transmissions across a plurality of sub-channels using multi-resolution modulation, where the sub-channels for each respective transmission have uniform capacity. Scheduling includes solving a linear programming relaxation of a maximization of a utility function, producing fractional allocations, determining a session having at most two fractional allocations, converting the fractional allocations to integral allocations; and allocating the session.

A multicast scheduling system is shown that includes a scheduling module configured to schedule layered data for one or more multicast transmissions across a plurality of sub-channels using multi-resolution modulation. The scheduling module further includes an allocation module configured to allocate sub-channels to layers based on a utility function.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
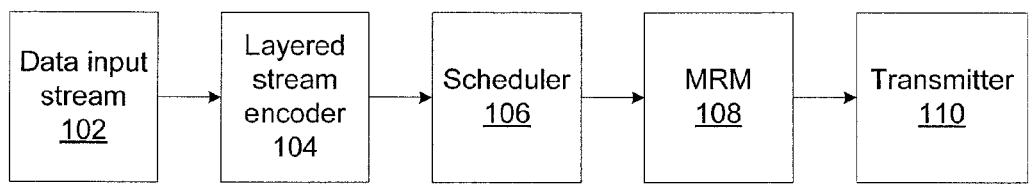
FIG. 1 is a block diagram showing an exemplary system for scheduling and transmitting layered multicast data.

While layered video (e.g., scalable video coding) can be used to address channel variation across users, it is not sufficient in the presence of channel diversity across sub-channels of a user. In this case, it is advantageous to consider layered video along with layered modulation, where layered modulation may also be referred to as superposition coded modulation or multi-resolution modulation (MRM). Layered modulation helps an orthogonal frequency division multiple access (OFDMA) system with or without channel diversity. However, its benefits are more pronounced in the presence of channel diversity. Thus the present principles address the multicast scheduling problem in the presence of layered video and layered modulation for OFDMA systems, both with and without channel diversity.

In particular, OFDMA systems include a set of K users who are subscribed to G multicast sessions; each session is to receive a video stream encoded into L layers, each with a given size of $\lambda_l$; and N transmission resources (sub-channels/tiles) are allocated for multicast services in an OFDMA frame transmission (e.g. LTE, WiMAX). Given the rates that can be supported by each of the users on each of the N resources, the present principles determine an allocation of the available N resources among the various multicast sessions as well as the various video layers within a session, such that the aggregate utility (measured by the perceived video quality of users) of the system is maximized.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an OFDMA transmission system is shown. A data input 102 is provided. This data is processed by enhancement stream encoder 104, which encodes the data as a plurality of streams including one basic stream and one or more enhancement streams. The description herein uses layered video as an exemplary data type, but it is also contemplated that audio data may be used or any other form of data that may be used with layered encoding. Layered video in particular is advantageous in delivering high quality video to as many users as possible, especially when the users have varying channel quality. Thus the video stream 102 is split into multiple layers by enhancement stream encoder 104 having a base layer and one or more enhancement layers. The base layer delivers stand-alone information that can be decoded into a basic video stream, while the successive enhancement layers add to the quality of the decoded base layer video. Receiving a given layer is generally only useful if all of the layers prior to it have been received successfully, introducing an implicit priority to lower layers.

Transmission scheduler 106 selects layered modulation and sub-channels for the data layers. In OFDMA, each user's sub-channel is composed of several frequency sub-carriers which form the basic unit of transmission at the physical layer. Given that the sub-channels of a user are inherently frequency-selective, the grouping of sub-carriers to form sub-channels affects the amount of channel diversity available for scheduling at the media access control (MAC) layer. Selecting sub-carriers in a distributed permutation (DP) from the entire frequency spectrum averages out and removes channel diversity, while grouping them in a contiguous permutation (CP) retains channel diversity. Retaining channel diversity comes at the cost of increased overhead in the form of per sub-channel feedback from each user in CP, while only a single channel quality value, averaged over the entire spectrum, is fed back by a user in DP. While WiMAX allows for both modes, LTE allows only the frequency selective CP mode.

The scheduler 106 also determines multi-resolution modulation (MRM) for transmission. In MRM, multiple distinct modulation symbols are composed to form a single multi-resolution signal, whereby each user will be able to decode as many bits from the modified signal as allowed by its channel quality. As an example, consider a system of two users whose channels support binary phase shift keying (BPSK) and quadrature phase shift keying (QPSK) respectively. User 1 is to receive a '0' and user 2 is to receive '01'. While this would need two symbol transmissions in conventional modulation, it can be achieved with a single symbol transmission using MRM.

One way to execute MRM in the example described above is with the help of super-position coded modulation, where the BPSK and QPSK symbols are superimposed on each other in the signal space and the resulting signal is transmitted. User 1's channel allows decoding only the BPSK symbol '0' whereas User 2, being aware of the super-position, will first decode the lower resolution BPSK symbol, remove it from the received signal, and extract the higher resolution QPSK symbol. During super-position, power is split between the different levels to ensure a desired level of bit error rate (BER) for each level taking into account the decoding process at the users. Unlike conventional modulation that requires the transmitter to notify the receiver of the modulation type used for encoding data on different sub-channels, MRM only needs to notify the number of levels used in the multi-resolution signal that is independent of the sub-channels used.

The MRM modulator 108 modulates the scheduled data onto the sub-carriers as directed by the scheduler 106. Transmitter accepts the modulated sub-carriers and transmits them to a plurality of users. Each user's sub-channel is composed of a plurality of orthogonal frequency sub-carriers.

Figure 2:
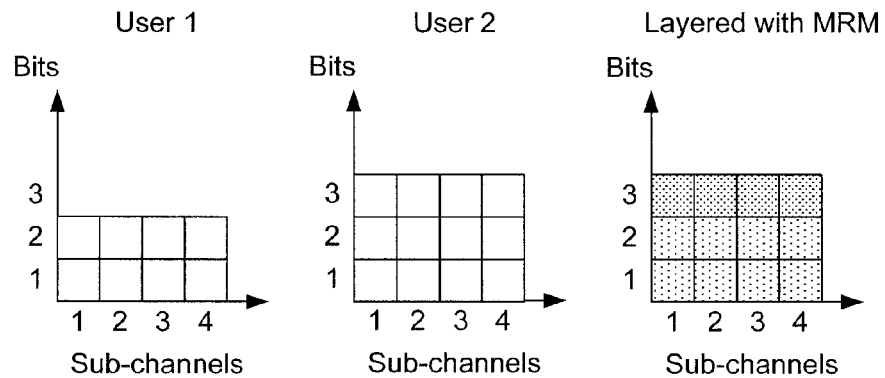
FIG. 2 is a set of diagrams showing the use of layered data in multi-resolution modulation.

Referring now to FIG. 2, an illustration of MRM with diversity across the users is shown. MRM 108 provides benefits to transmissions both in DP mode and in CP mode. Consider a system with four sub-channels and two users, where the modulation and coding rate (MCS) supported by the two users being two and three bits respectively as seen in FIG. 2. The video stream may be split into two layers, with the size of the first layer being eight bits and that of the second layer being four bits. With conventional modulation, the system can deliver only the first layer to both of the users, being limited by the channel quality of User 1.

However, a two-resolution symbol may be employed that superimposes MCS levels of two and three bits, as shown in FIG. 2. User 1 is now capable of decoding two bits from each superimposed symbol, while user 2 can decode all of the bits. Hence, encoding the eight bits of layer 1 using the two bits from lower resolution on each sub-channel and the four bits of layer 2 using the additional bit from the higher resolution, User 1 is able to decode the first layer as before, while User 2 can decode both of the layers. Thus, while conventional modulation requires every sub-channel to operate at the minimum MCS of all the users subscribed to a layer, MRM removes this dependence. This permits MRM to effectively use all the available bits that can be supported by each user to accordingly allocate layers to them.

Figure 3:
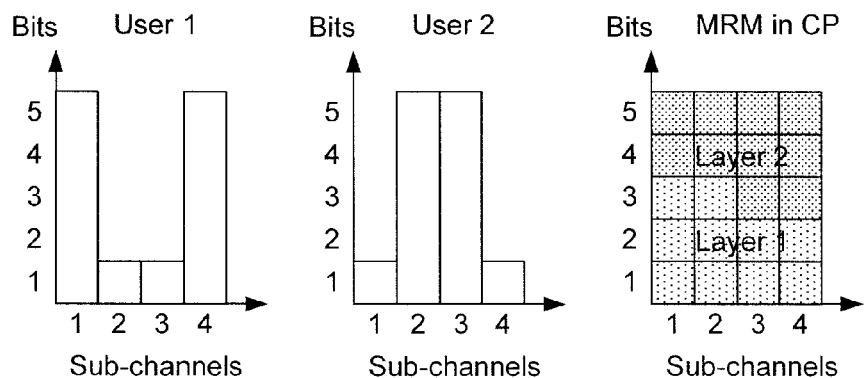
FIG. 3 is a set of diagrams showing the use of layered data in multi-resolution modulation with diversity across sub-channels for a given user.

Referring now to FIG. 3, MRM is shown with diversity across sub-channels. The benefits of MRM are more pronounced for a system with channel diversity, such as one running in CP mode. To see this, consider a system with two users and four sub-channels, with the MCS of both the users being three bits in the DP mode. Now consider the CP mode, where the MCS varies across sub-channels for each user while maintaining the average to be the same as in DP mode, namely three bits. The video stream may be encoded into two layers, with seven and five bits for the first and second layers respectively. In conventional modulation, both the users will receive both of the layers in DP mode, as the twelve bits may be spread evenly across the sub-channels. However, diversity across sub-channels would reduce the MCS to one bit on each of the sub-channels in CP mode, as seen in FIG. 3. Conventional modulation reduces to the lowest common bitrate.

With MRM, there is no additional benefit in DP mode, but in CP mode a two-level super-position of one- and five-bit symbols helps deliver both of the layers to both the users as shown in FIG. 2. Thus, diversity across the sub-channels of a user can have an adverse effect with conventional modulation, but MRM removes the dependence of the MCS of a sub-channel to the minimum of the users considered. This produces significant benefits in the presence of channel diversity.

Since the number of bits that users can decode varies from one sub-channel to another, to leverage the benefits of MRM each video layer of k bits needs to be encoded into n bits (n>k), such that receiving any k out of n bits is sufficient to reconstruct the layer. This can be achieved with any suitable coding scheme, such as Reed-Solomon codes, Luby transform codes, etc. In the example of FIG. 3, both layers are encoded into ten bits each with corresponding coding rates of ¾ and ½ for layers one and two respectively. Hence, a total of 20 bits (10 for each layer) are transmitted using four five-bit MRM symbols on the four sub-channels to permit the users to recover both layers.

In the above examples, layers are packed first across sub-channels and then across modulation levels in MRM (called horizontal packing). One can also consider an equivalent vertical packing.

Figure 4:
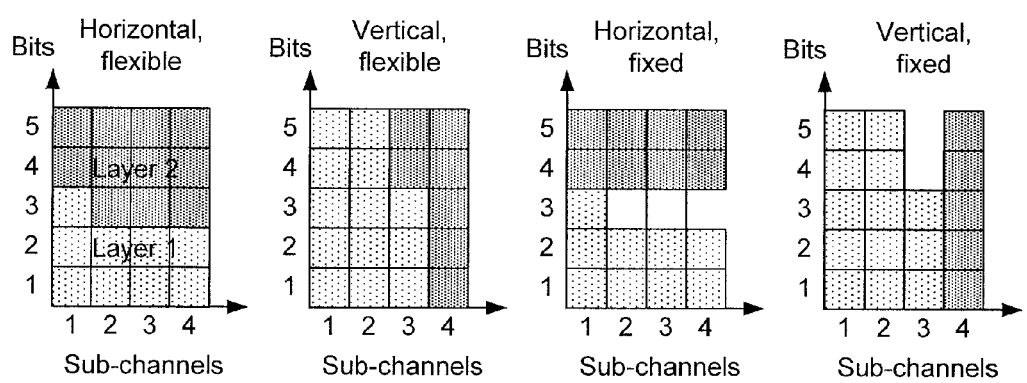
FIG. 4 is a set of diagrams comparing the user of layered data with horizontal and vertical allocation.

Referring now to FIG. 4, a comparison of horizontal and vertical packing schemes is shown. While both "flexible" packings (where layer allocations may be terminated within a modulation level) yield benefits in the CP mode, it is only the horizontal packing that yields benefits in DP. Since there is no diversity across sub-channels in DP, when the layers are packed vertically there is no diversity for MRM to average across layers.

Further, terminating the allocation to a layer in the middle of a modulation level requires significant signaling to clients and may not be feasible in practical implementations. Hence, when multiple layers cannot share a modulation level in MRM they are called "fixed." When layer allocations cannot be terminated flexibly, this may result in under-utilization either across the sub-channels in horizontal packing or across the modulation levels in vertical packing. Given that the number of sub-channels is usually greater than the number of MRM levels, potential under-utilization will be lower in vertical packing. Hence both horizontal and vertical packing of layers in CP mode may be considered advantageous.

In a synchronous, time-slotted system similar to WiMAX and LTE, with the base station (BS) transmitting data in frames, every frame includes several time slots and has to be populated with user assignments across sub-channels (for LTE) or across both time slots and sub-channels (for WiMAX). To address both models it is sufficient to consider the problem with one time slot per frame having multiple sub-channels, since sub-channels in other slots are equivalent to additional sub-channels available to the considered slot.

The present principles provide K users subscribed to one of G multicast sessions, operating on a total of N sub-channels set aside for multicast transmissions within a frame. For multicast scheduling, assignments are made with respect to sessions, where multiple mobile stations (MSs) can be subscribed to a session. Multicast sessions with layered video (L layers) and MRM (M levels) are shown herein. MRM levels provide another dimension beyond the sub-channels to the resources available for scheduling. The allocation of these resources to various video layers of different sessions is notified to the MS through the control part of the frame that precedes the payload and is transmitted at the most robust (lowest) modulation and coding.

The goal of the scheduler 106 is to allocate the available resources in a frame (sub-channels and MRM levels) to the different video layers of sessions so as to maximize the video quality that can be delivered to as many users as possible. The video quality of a user is a function of the received video rate, which in turn depends on the number of video layers received successfully by the user. Further, the lower layers of the video are more important as they are needed for the successful decoding of subsequent layers. This inherent non-linearity can be captured with the help of generic utility functions $U_k(R_k)$, where $U_k$ is the utility (representative of perceived video quality) of user k on receiving a video rate of $R_k$. Note that $R_k$ is a function of the number of layers $l_k$ received by user k, $$R_k = \sum_{i=1}^{l_k} \lambda_i,$$

where $\lambda_i$ is the size of layer k. It may be assumed that different users have different utility functions but belong to the class of concave, non-decreasing functions of the received video rate. This includes functions that capture most of the desired video quality objectives such as rate-distortion, short-term proportional fairness for real-time video, etc. The objective of the scheduler 106 reduces to maximizing the aggregate utility of the system: max $\Sigma_k U_k(R_k)$, where $$R_k = \sum_{l=1}^{L} y_{k,l} \lambda_l$$

and $y_{k,l}$ is the binary variable indicating the allocation of layer l to user k.

In the presence of multiple multicast sessions, resource allocation involves allocating a contiguous subset of subchannels to each multicast session and allocating resources contiguously from the given set of sub-channels to video layers within each session. Contiguous allocation of sub-channels is used to keep signaling overhead low. The system is to be optimized according to asset of resource allocation constraints that ensure a feasible multicast schedule as output.

In CP, because sub-channels support different MCS for different users, allocation of specific sets of sub-channels to layers and sessions becomes important whereas, in DP, it is sufficient to note the number of sub-channels allocated. If the utility $C_g$ is the set of contiguous sub-channels allocated to session g, then in CP the total set of sub-channels allocated to multicast sessions should not exceed those from the set $N=\{1, 2, \ldots, N\}$, while being disjoint across sessions.

$$\bigcup_g C_g \subseteq N,$$

$$C_i \cap C_j = \emptyset$$

For DP, one only needs to ensure that the sum of sub-channels allocated to different sessions does not exceed N.

$$\sum_g |C_g| \leq N$$

Each sub-channel has multiple MRM levels. Hence, given a set of sub-channels to a session, resources can be allocated both across the given sub-channels and MRM levels. In CP, resources allocated to layers may be sub-channels chosen contiguously from a session's set of sub-channels, with all the MRM levels associated with a sub-channel being allocated along with it. In DP, resource allocation is only across the MRM levels, with all the session's sub-channels being assigned to a layer along with the modulation level. If s represents the set of contiguous sub-channels in CP (or MRM levels in DP) that can be allocated from $C_g$, every layer of session g may be required to be assigned to at most one subset. Further, to ensure that the allocated resources are disjoint across layers, every sub-channel c in CP (or MRM level m in DP) is allocated to at most one layer. Hence:

$$\sum_s x_{s,l,g} \leq 1, \forall l, g$$

$$DP: \sum_l \sum_{s: m \in s} x_{s,l,g} \leq 1, \forall m, g$$

$$CP: \sum_l \sum_{s: c \in s} x_{s,l,g} \leq 1, \forall c, g$$

where $x_{s,l,g}$ is a binary variable indicating the assignment of resource subset s to layer l in session g. Since layer l cannot be decoded without receiving layer l−1, resources are allocated to l only if l−1 has received resources.

$$\sum_s x_{s,l,g} \leq \sum_s x_{s,l-1,g}, \forall l, g$$

A user k can receive a layer l only if the net rate $r_{k,s}$ supported on all the user's resources s allocated to that layer $x_{s,l,g}$ in the user's session g is sufficient to receive the layer. If $y_{k,l}$ represents the binary variable indicating the assignment of layer l to user k, then $$\sum_s x_{s,l,g} r_{r,k} \geq y_{k,l} \lambda_l, \forall l, k \in g$$

$$DP: r_{k,s} = \left(\sum_{m \in s} r_{k,m}\right) |C_g|$$

$$CP: r_{k,s} = \left(\sum_{c \in s} r_{k,c}\right).$$

Let $r_m$ represent the number of bits that can be sent at MRM level m on a sub-channel. If the user k can receive up to $m_{k,c}$ levels on sub-channel c, then the rate supported by c is $$r_{k,c} = \sum_{i=1}^{m_{k,c}} r_i,$$

which varies with c in CP. On the other hand, the rate at level m $r_{k,m}=r_m$, if $m_k \geq m$ and $r_{k,m}=0$ otherwise. The rate does not vary with sub-channels in DP. Further, a layer received by a user is useful only if all the prior layers have been received. Hence, $$y_{k,l} \leq y_{k,l-1}, \forall k,l.$$

The multicast scheduling problem with layered video and modulation can solved efficiently in both DP and CP modes. Considering first the case of a single multicast session (i.e., for a given g), the corresponding scheduling problem under DP may be formulated as:

$$\max\left(T_g(n_g) = \sum_{k \in g} U_k(R_k)\right)$$

$$\text{subject to: } \sum_s x_{s,l,g} \leq 1, \forall l$$

$$\sum_l \sum_{s: m \in s} x_{s,l,g} \leq 1, \forall m$$

$$\sum_s x_{s,l,g} \leq \sum_s x_{s,l-1,g}, \forall l$$

$$\sum_s x_{s,l,g} r_{k,s} \geq y_{k,l} \lambda_l, \forall l, k \in g$$

$$y_{k,l} \leq y_{k,l-1}, \forall l, k \in g,$$

where $r_{k,s} = n_g \sum_{m \in s} r_{k,m}$ and $T_g(n_g)$ is the total utility obtained when $n_g$ sub-channels are allocated to group g. In DP the user rates do not vary across sub-channels. With conventional modulation, when an MCS in is chosen for transmission on a sub-channel, users whose channels support an MSC level below m will not be able to decode any data, while users with channels that support levels greater than m will not be able to leverage that superior channel quality. This binary decoding capability makes the multicast scheduling problem difficult even with one session in DP using conventional modulation, where the given sub-channels to a session ($n_g$) are split between video layers and an MCS is chosen for transmission on each layer. However, MRM's flexible decoding capability removes this difficulty, allowing the problem to be solved in polynomial time. The optimal solution uses all $n_g$ sub-channels for allocation to each of the layers but matches the progressive modulation levels to the progressive video layers, thereby allowing users to completely utilize the respective channel qualities in receiving a proportional video quality. Hence, the solution starts by allocating the base layer to the lowest modulation level, uses all $n_g$ sub-channels, and then moves to the higher levels. The next layer is progressively allocated from where the previous layer's allocation finished. However, if multiple layers cannot share a modulation level, then the next layer's allocation will start at the next modulation level. The examples shown in FIGS. 2-4 employ this allocation strategy. Faunally, the allocation of MRM levels to layers in DP multicast scheduling can be determined in O(M L) time as follows. The below method is denoted herein as "DPS1."

---

Input: Layer size $\lambda_l$, MRM levels with $r_m$, # of sub-channels $n_g$
Output: Termination level for each layer, $t_l$
$t_0 = 0$
for $l \in [1, L]$ do
    S = 0
    for m $\in [t_{l-1} + 1, M]$ do
        S = S + $r_m n_g$
        if S $\geq \lambda_l$ then $t_l$ = m ; break end
    end for
end for

---

Figure 5:
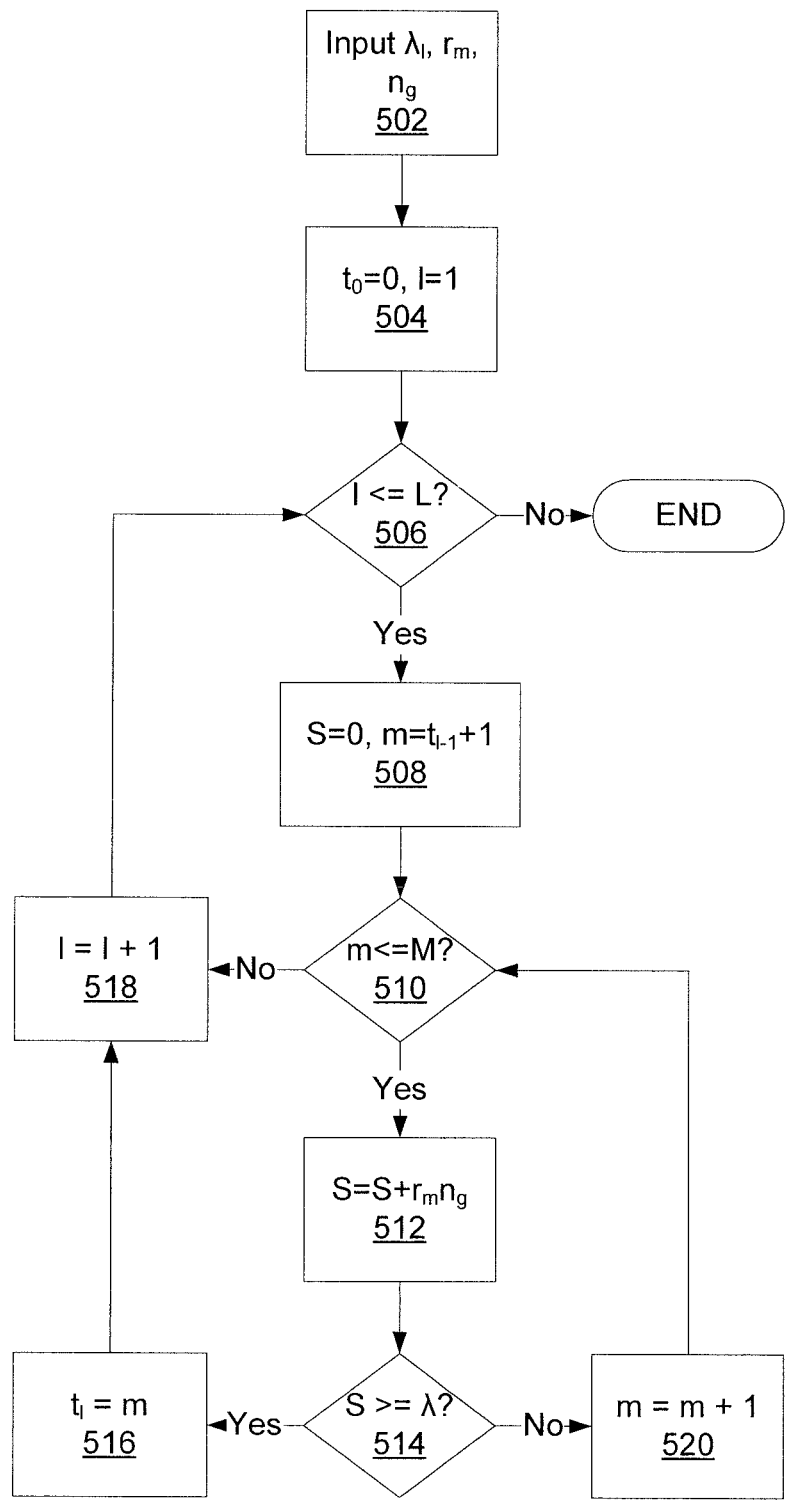
FIG. 5 is a block/flow diagram of an exemplary scheduling process for a system with diversity across users with a single session.

Referring now to FIG. 5, a block/flow diagram of DPS1 is shown. DPS1 accepts as input $\lambda_l$, $r_m$, and $n_g$ at block 502, then initializes $t_0$ to zero and sets a counting variable l to one at block 504. A loop then begins testing whether l has reached the number of layers L at decision block 506—once l>L, then DPS1 terminates. If l is still below L, block 508 initializes S to be zero and initializes a counting variable m to be the termination level at l−1, plus one. In this way, counting begins where the termination level of the previous level left off.

A second loop begins testing whether m has reached the number of modulation levels M at decision block 510. If all of the modulation levels have been checked and m exceeds M, block 518 increments l and processing returns to block 506. If there are still modulation levels left to check, block 512 adds to S the product of the number of MRM levels $r_m$ and the number of subchannels $n_g$. Block 514 then tests whether S has reached the layer size $\lambda_l$. If not, block 520 increments m and processing returns to block 510. If so, however, $t_l$ is set to m at block 516, setting the termination level for layer l to be m. Block 518 the increments l and processing then returns to block 506.

While MRM removes the difficulty of the scheduling problem for a single session, that ease does not extend to multiple sessions. Video multicasting with MRM is NP-hard under DP with multiple sessions. This comes as a result of being reducible to the "knapsack problem" where, given a container of capacity N and a set of G items such that each item j has a value $p_j$ and size $s_j$, the container is filled with a subset of items of maximum profit without exceeding the capacity. In the present context, there are G multicast sessions and N sub-channels. The video stream has only one layer of size $\lambda$. Each session j has only one subscriber with a rate $r_j$ on each sub-channel and has a utility of $a_j \log(1+\lambda)$ if the subscribed user receives the layer and 0 otherwise, where $a_j$ tracks fairness across sessions over time. It can be shown that this scenario reduces to the knapsack problem, an NP hard problem. Due to this complexity, efficient solutions may be approximated and appropriate approximation guarantees may be enforced. To this end, a fully polynomial time approximation scheme (FPTAS) based on dynamic programming is used.

Figure 6:
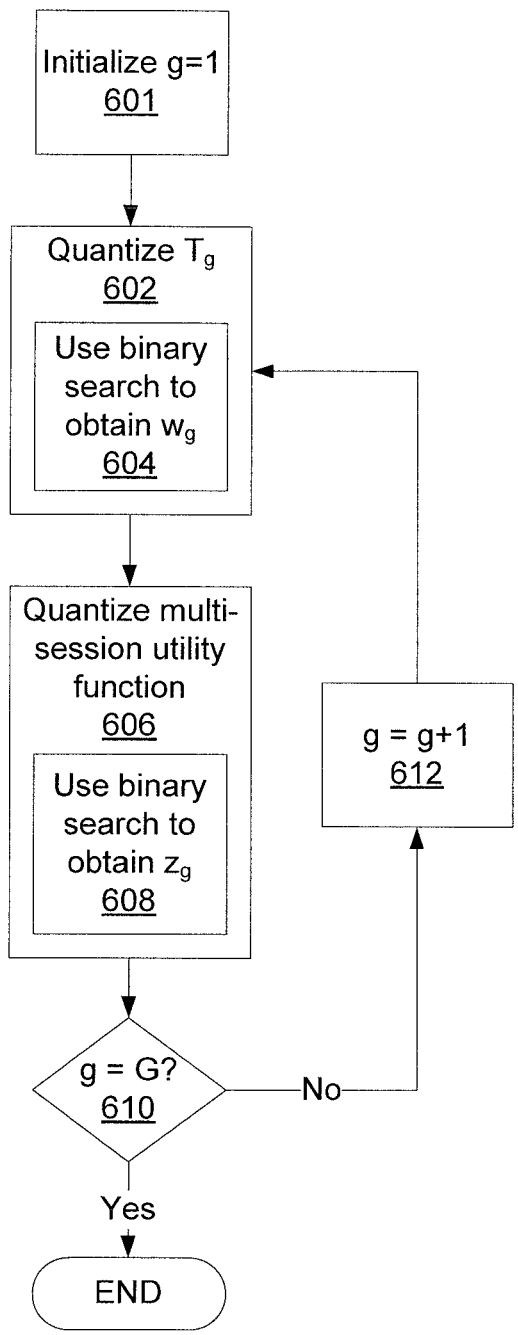
FIG. 6 is a block/flow diagram of an exemplary scheduling process for a system with diversity across users with multiple sessions based on dynamic programming.

Referring now to FIG. 6, a dynamic programming based algorithm (DPSg-DP) is shown to implement the FPTAS. Block 602 quantizes $T_g$ in steps of $(1+\gamma)$, with $\gamma$ being a quantization measure selected to produce a desired approximation guarantee as described below. It does this by employing block 604 to perform a binary search, obtaining $w_g$, where $$w_g = \min_{n_g}\{n_g : T_g(n_g) \geq (1 + \gamma)^s\}$$

for all $$s = 1, 2, \ldots, \frac{\log(NU(R_{max}))}{\log(1 + \gamma)},$$

where $$R_{max} = \sum_{l=1}^{L} \lambda_l$$

for a layer size $\lambda$ and session j. This takes O(log N) computations of $T_g(N_g)$, which in turn can be computed optimally in polynomial time using the DP multicast scheduling described above. Let $\tilde{T}_g(N_g)$ be the quantized version of $T_g(N_g)$, given by:

$$\tilde{T}_g(n_g) = (1+\gamma)^s, \text{ where } w_g(s) \leq n_g \leq w_g(s+1),$$

and $w_g$ is the minimum number of sub-channels needed by group g to attain at least a specific value of utility.

Block 606 then quantizes a multi-session utility function:

$$V_p(n) = \max_{\sum_{g=1}^{p} n_g \leq n} \left\{\sum_{g=1}^{p} T_g(n_g)\right\},$$

using block 608 to perform a binary search and obtain $z_p$, where $$z_p(t) = \min_{n}\{n : V_p(n) \geq (1 + \gamma)^t\}.$$

Here t=1, 2, . . . , $$\frac{\log(GNU(R_{max}))}{\log(1 + \gamma)}.$$

Each of the above iterations involves solving the recursion:

$$V_p(n) = \max_{t}\{(1 + \gamma)^t + \tilde{V}_{p-1}(n - z_p(t))\},$$

where $\tilde{V}_p$ is the quantized version of $V_p$. Obtaining $V_G(N)$ using this procedure yields a final desired solution. The time complexity of DPSg-DP is dominated by the second step, which takes $$O\left(\frac{G\log(N)\log^2(GNU(R_{max}))}{\log^2(1+\gamma)}\right)$$

to compute $V_G(N)$.

The above steps may be iterated through all of the multicast sessions G. Block 601 initializes a counting variable g to one. After quantizing the utility function at block 606, decision block 610 tests whether all of the sessions have been tested. If not, g is incremented at block 612 and processing returns to block 602. If so, processing terminates. It can be shown that DPSg-DP has an approximation guarantee of $(1-\epsilon)$, where $\epsilon$ is a small, non-zero constant. As DPSg-DP runs through its G iterations, each iteration incurs a loss factor of $(1+\gamma)$ from the quantization. The result is a net loss factor of $(1+\gamma)^G$. $\gamma$ may therefore be selected such that $(1+\gamma)^G=(1+\epsilon)$, which produces the desired approximation guarantee.

Although DPSg-DP's time complexity is polynomial with the size of the input and $1/\epsilon$, it has a slow convergence in practical scenarios. This is because, as $\epsilon$ grows smaller, the number of quantization steps (based on $\gamma$) increases dramatically. Hence, to address slow divergence, an alternative approach may be used that is based on an integer programming formulation and its linear programming (LP) relaxation. This approach is denoted as DPSg-LP and uses the following formulas:

$$\text{Maximize} \sum_{g=1}^{G}\sum_{s=1}^{N} x_{s,g} C_{s,g}$$

$$\text{subject to,} \sum_{s=1}^{N} x_{s,g} = 1, \forall g$$

$$\sum_{g}\sum_{s=1}^{N} sx_{s,g} \leq N$$

where, $x_{s,g} = \{0,1\}, s = [0, N]$.

In the above formulation of DPSg-LP, s represents the number of tiles that can be assigned to a session, which is indicated by the variable $x_{s,g}$. Only one of the N possible values of s can be assigned to each session and the corresponding utility is given by $C_{s,g}=T_g(s)$, given by DPS 1. In this case, DPSg-LP is an instance of the multiple choice knapsack problem, wherein there are multiple classes of items. Each item inside a class has its own weight and value and the objective is to pick exactly one item from each class so as to maximize the aggregate value without exceeding the knapsack capacity. Classes correspond to sessions in this embodiment and items correspond to a number of sub-channels. The LP relaxation of the multiple choice knapsack problem has at most two fractional variables and both fractional variables belong to the same class. This embodiment of DPSg-LP inherits both of these properties.

Figure 7:
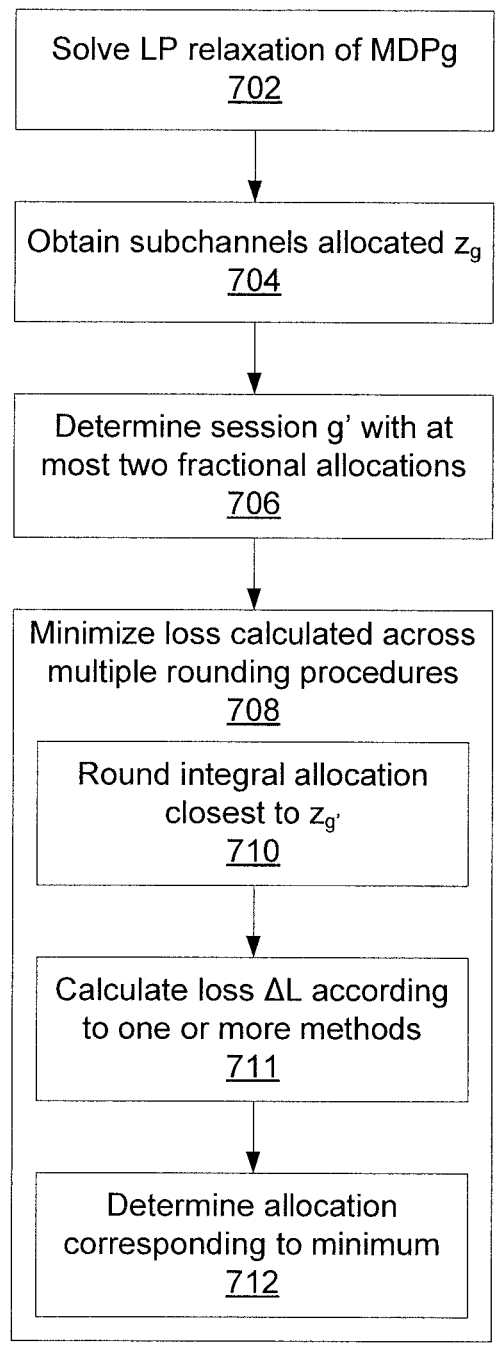
FIG. 7 is a block/flow diagram of an exemplary scheduling process for a system with diversity across users with multiple sessions based on linear programming.

Referring now to FIG. 7, a block/flow diagram of DPSg-LP is shown. Block 702 first solves an LP relaxation with $x^*_{s,g}$ as the fractional output. Note that a simple greedy algorithm can be used to obtain the optimal LP relaxation solution for the multiple choice knapsack problem without resorting to an LP solver. As stated, the optimization problem is an integer program, since the variables to be determined 'x' can take only integral values. By relaxing the integer constraint to allow the variables to take fractional values, the optimization becomes an LP which can be solved efficiently using known online solvers. This procedure of relaxing the integrality constraint the solving the problem is called LP relaxation. However, because only fractional values for 'x' result, the fractional values are rounded to integral values to obtain a feasible allocation. How to round the fractional variables back to integral ones is dependent on the problem, such that there are a variety of different possible rounding functions (as shown below).

Block 704 then obtains the net (fractional) allocation $z_g$ of the subchannels to each session as $z_g=\Sigma_s s x^*_{s,g}$. As noted above, because both fractional variables belong to the same class, block 706 determines a session g' whose variables ($x^*_{s_1,g}$ and $x^*_{s_2,g}$) receive fractional allocation. In particular, this may include selecting g' where there exists an $s_1<s_2$ with $x^*_{s_1,g'}, x^*_{s_2,g'} \neq \{0,1\}$ and $x^*_{s_1,g'}+x^*_{s_2,g'} \leq 1$. The fractional allocation may then be converted to an integral allocation that incurs the smallest loss in block 708.

Block 708 minimizes the loss by performing multiple rounding procedures and selecting the rounding procedure that produces the lowest loss. Block 710 rounds $z_g$ to the nearest integral allocation, $\lfloor k_g \rfloor$. Block 711 calculates a loss $\Delta L$ according to one or more methods. A first method may include rounding the allocation to g' to $\lfloor z_g \rfloor$ sub-channels, where $$\Delta L_1 = \Sigma_s x_{s,g} C_{s,g} - C_{\lfloor z_g \rfloor, g'}.$$

A second method may include rounding the allocation to g' to $s_1$, the smaller allocation of the fractional variables, while accounting for the additional gain obtained by allocating the unused subchannels ($\delta_1$) from g' to other sessions. This may be expressed as:

$$\Delta L_2 = \Sigma_s x_{s,g} C_{s,g} - C_{s_1,g'} - \max_{g \neq g'}\{C_{(z_g+\delta_1),g} - C_{z_g,g}\},$$

where $x^*_{s_1,g'}=1$, $x^*_{s_2,g'}=0$, and $\delta_1 = \lfloor z_g - s_1 \rfloor$. A third method may include rounding the allocation to g' to $s_2$, the larger allocation of the fractional variables, while accounting for the additional loss incurred by other sessions in removing the number of subchannels over-used ($\delta_2$) by g' to retain feasibility. This may be expressed as:

$$\Delta L_3 = \Sigma_s x_{s,g} C_{s,g} - C_{s_2,g'} + \min_{g \neq g'}\{z_{g,g'} - C_{(z_g-\delta_2),g}\},$$

where $x^*_{s_2,g'}=1$, $x^*_{s_1,g'}=0$, over-used channels $\delta_2 = \lfloor s_2 - z_{g'} \rfloor$, and where $C_{(z_g-\delta_2),g}=\infty$ if $(z_g-\delta)<0$. A fourth method may include rounding the allocation to g' to $s_2$, assuming that none of the other sessions individually have enough channels $(z_g-\delta_2<0)$ to compensate for the channels over-used by g' and, hence, collectively contribute to loss. Thus, if $\delta_2 \leq \Sigma_{g \neq g'} z_g$, the fourth method may be expressed as:

$$\Delta L_4 = \Sigma_s x_{s,g} C_{s,g} - C_{s_2'} + \Sigma_{g \neq g'} C_{z_g,g}.$$

Otherwise, $\Delta L_4=\infty$. C is the received utility, where $C_{a,b}$ refers to the utility received when a sub-channels are allocated to group/session b.

Having calculated losses across the one or more rounding methods, block 712 selects an allocation corresponding to the rounding procedure that incurs the minimum loss. For example, if all of the above-discussed rounding methods are employed, then the allocation would be selected that corresponds with $\min(\Delta L_1, \Delta L_2, \Delta L_3, \Delta L_4)$.

DPSg-LP uses an LP relaxation with NG variables and is hence technically pseudo-polynomial, as it scales with N. However, N realistically takes small values (for example 20-40 sub-channels in LTE and WiMAX scenarios), which allows DPSg-LP to deliver significantly lower runtimes than DPSg-DP.

DPSg-LP is a ½ approximation method. If LP relaxation returns integral solutions for all variables, then DPSg-LP is optimal. However, when the relaxation returns two fractional variables for some session g', one of the following two cases results. In the first case, where $\Sigma_s x_{s,g'} C_{s,g'} \leq \Sigma_{g \neq g'} C_{z_g,g}$, rounding the allocation of g' to either $\lfloor z_{g'} \rfloor$ or $s_1$ will either retain or improve the existing allocation (and objective value) of all other sessions, resulting in at least half of the optimal LP relaxation performance. In the second case, where $\Sigma_s x_{s,g'} C_{s,g'} > \Sigma_{g=g'} C_{z_g,g}$, the allocation to g' gig'R delivers a higher objective value, it may be determined whether its value can be retained after rounding the allocation to $s_2$. With $C_{s_2,g'} \leq C_{z_g,g'}$, DPSg-LP checks to see if the over-used channels $\delta_2$ can be removed from the allocations to the other sessions. If this is possible, then DPSg-LP once again will retain at least half the performance. On the other hand, if the net allocation to all other sessions is not able to compensate for the over-used channels ($\delta_2 < \Sigma_{g \neq g'} z_g$), then this means that the fractional allocation to g' cannot be part of the optimal integral solution to begin with. In this case, DPSg-LP will return the optimal solution. While the worst case performance of DPSg-LP can be bounded within half of the optimal solution, realistic scenarios maintain near-optimal performance in practice.

Considering now a formulation for multicast scheduling under CP, the generic multi-session scheduling problem in CP may be formulated as:

$$\text{maximize} \sum_g \sum_{k \in g} U_k(R_k)$$

$$\text{subject to,} \sum_s x_{s,l,g} \leq 1, \forall l, g$$

$$\sum_l \sum_g \sum_{s:c \in s} x_{s,l,g} \leq 1, \forall c \in [1, N]$$

$$\sum_s x_{s,l,g} \leq \sum_s x_{s,l-1,g}, \forall l, g$$

$$\sum_{s,g:k \in g} x_{s,l,g} r_{k,s} \geq y_{k,l} \lambda_l, \forall l, k$$

$$y_{k,l} \leq y_{k,l-1}, \forall l, k,$$

where $$R_k = \sum_{l=1}^{L} y_{k,l} \lambda_l.$$

Further, s now indicates the contiguous set of sub-channels that can be allocated to a layer, of which there are $$\frac{N(N+1)}{N}.$$

Since $r_{k,s} = (\Sigma_{c \in s} r_{k,c})$ where $r_{k,c}$ varies with sub-channel c, a user's rate in a subset sdepends not only on the number of sub-channels in s but also on which particular sub-channels are included in s.

It can be shown that MCPg is NP-hard, even for the single session case. For example, in a system where all the subchannels of a user support the same MCS level (e.g., DP mode is a special case of CP mode), allocating sub-channels to different layers (vertical packing) in the presence of MRM does not yield any benefits and the performance reduces to that of conventional modulation. Hence, when there is no channel diversity in the system, CP scheduling with MRM reduces to one with conventional modulation in the DP mode. This has been shown to be NP-hard even for a single session, and so MCPg is also NP-hard.

Given the complexity of MCPg, the challenge is to design a scheduler that not only has a fast running time, but also good efficiency. When additional sub-channels are allocated to a layer l, this increases the number of users whose net rate on those sub-channels from MRM is sufficient to receive the layer. However, this also reduces the number of sub-channels that are available for allocation to subsequent layers. Hence, the goal of any scheduler is to parititoni the available (contiguous) set of sub-channels among different layers sequentially, so as to balance this tradeoff and hence maximize the aggregate system utility. This in turn entails that, at every iteration, the sub-channel where the allocation to the current layer terminates needs to be determined.

Conventional greedy algorithms would evaluate the marginal utility gain per sub-channel ($\Delta U_c$) contributed by adding c contiguous sub-channels in succession and then select the terminating sub-channel c' as having the highest marginal utility. While these algorithms have fast running times, their myopic approach only works when the user rates remain the same across sub-channels. However, greedy algorithms could lead to significant inefficiency in the presence of channel diversity.

Figure 8:
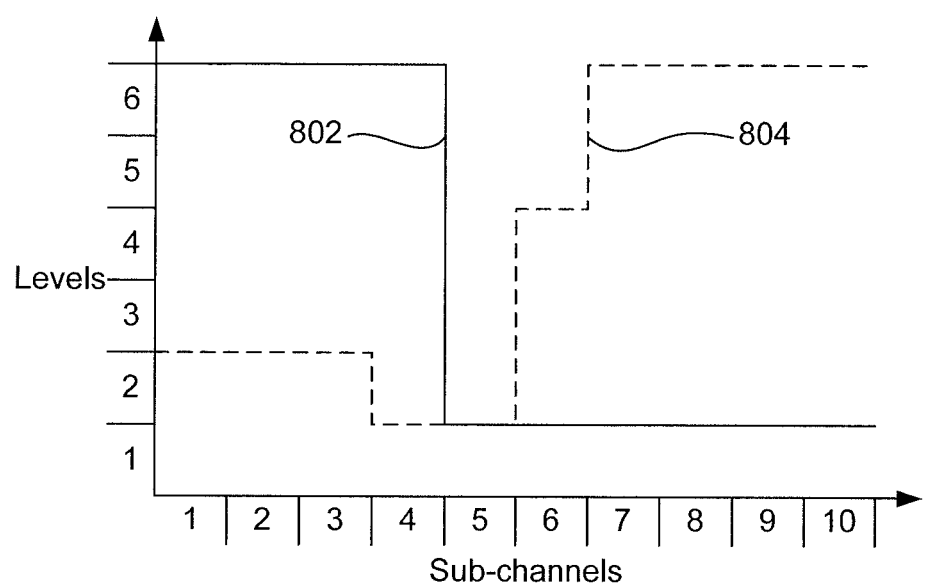
FIG. 8 is a diagram showing channel diversity patterns of users.

Referring now to FIG. 8, a system having 10 sub-channels is shown, where the size of each video layer is $\lambda = 12$ bits. The channel diversity of each user falls into one of the two patterns, 802 and 804, shown in FIG. 8. In this exemplary system, $n_1$ users exhibit pattern 802, while $n_2$ users exhibit pattern 804. Let $n_2 = (2-\epsilon)n_1$. Allocation to layer 802 can be terminated at one of two conditions. First, allocation to 802 may be terminated at c=2, with $$\Delta U_2 = \frac{n_1 U(\lambda)}{2},$$

where only $n_1$ users will receive layer 1, while $n_2$ users will not receive any layers. Second, allocation 802 may be terminated at c=6, with $$\Delta U_6 = \frac{(n_1 + n_2) U(\lambda)}{6},$$

where $n_1 + n_2$ users will receive layer 1 at the cost of using more sub-channels. In this case, $\Delta U_2 > \Delta U_6$ and, hence, layer 1 will be terminated at c=2. Proceeding further, this allocation, $A_1$, will allow only $n_1$ users to receive two layers with a net utility of $U_{A_1} = n_1 U(2\lambda)$. However, if layer 1 is terminated at c=6, producing allocation $A_2$ this would allow $n_1$ users to receive only one layer, but $n_2$ users would receive three layers, resulting in a net utility of $U_{A_2} = n_1 U(\lambda) + n_2 U(3\lambda)$, which almost doubles the performance over $A_1$. Being myopic in its decision, $A_1$ does not account for the change in quality on subsequent sub-channels of users.

To address this shortcoming, inherent in myopic greedy policies, an alternative greedy scheduling method CPSg combines not only the marginal gain resulting from a decision, ΔG, but also the marginal loss ΔL associated with the decision using the utility metric $$\frac{\Delta G}{\Delta G + \Delta L}.$$

Incorporating the loss in its decision helps CPSg account for channel diversity in the system to keep its sub-optimality very small as well as provide efficient performance guarantees in certain cases.

Figure 9:
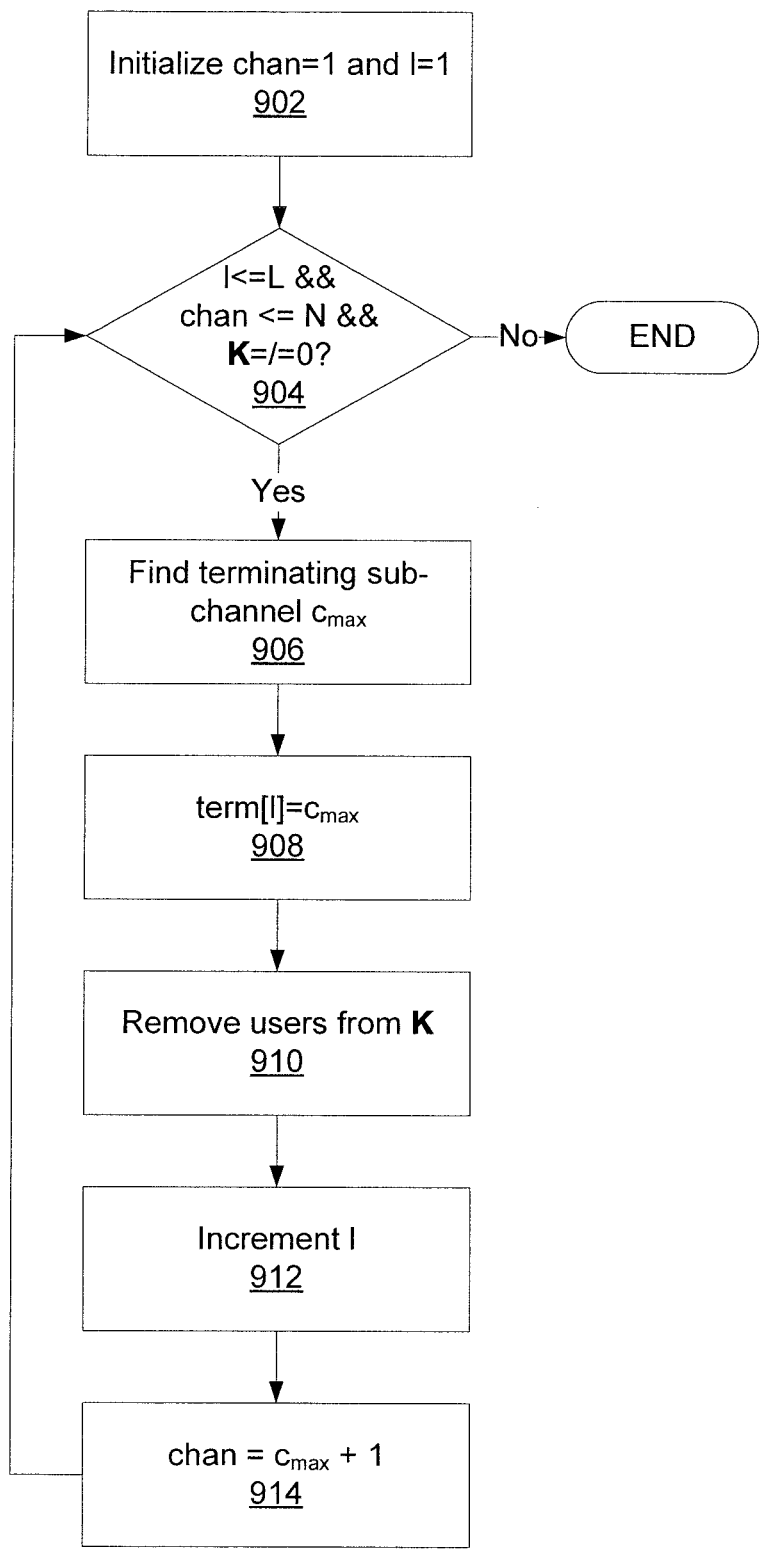
FIG. 9 is a block/flow diagram of an exemplary scheduling process for a system with diversity across sub-channels with an arbitrary number of sessions.

Referring now to FIG. 9, a block/flow diagram of an implementation of CPS with a single session (CPS1) is shown. While CPS1 works with video layers of different sizes, the following describes all layers as being of the same size λ for the purpose of illustration. Block 902 initializes two counting variables, l and chan, to 1. Block 904 then begins a loop that sequentially allocates contiguous sets of sub-channels to video layers, beginning with l=1. A set K includes all of the eligible users, {0, ..., K}, made up of those users which had received all prior layers. Block 904 determines whether there are remaining layers, channels, and eligible users. The terminating sub-channel $c_{max}$ is given as the sub-channel that yields the highest value of the metric $$\frac{\Delta G}{\Delta G + \Delta L}$$

and sets the set of sub-channels [chan, $c_{max}$] to be allocated to l. Block 906 finds $c_{max}$ by iterating over the channels c between chan and N, calculating the metric for each as $$\frac{\sum_{k \in K} \Delta G(k, l, chan, c)}{\sum_{k \in K} \Delta G(k, l, chan, c) + \Delta L(k, l, chan, c)}.$$

If a non-zero $c_{max}$ is found, block 908 sets the terminating sub-channel for l to be $c_{max}$, block 910 removes all users k from K such that $$\sum_{i=chan}^{c_{max}} r_{k,i} < \lambda,$$

block 912 increments l, and block 914 sets chan to one greater than $c_{max}$. Terminating sub-channels are found until all sub-channels are used, all layers are allocated, or the set of eligible users is empty.

Block 906 calculates the marginal gain and marginal loss of each eligible user k. The marginal gain depends on whether the user's net rate on the sub-channels from MRM is sufficient to support the layer l, such that ΔG(l.k.chan,c)=U(lλ)−U((l−1)λ) if $$\sum_{i=chan}^{c} r_{k,i} \geq \lambda.$$

In determining the marginal loss, it should be recognized that, while terminating a layer l at sub-channel $c_1$ may provide sufficient rate for user 1 to receive l, termination might be preferable at $c_2$ to accommodate additional users. In this case, all the sub-channels between $c_1$ and $c_2$ will not contribute to user 1's utility and will hence diminish its potential to receive more layers. This loss experienced by a user is obtained by determining the potential set of layers $l_{pre}$ that the user could have received prior to the allocation of l and comparing it to the set of layers $l_{post}$ that the user could receive given termination at $c_2$. In that case, $$l_{pre} = l - 1 + \left\lfloor \frac{\sum_{j=chan}^{N} r_{k,j}}{\lambda} \right\rfloor.$$

If $$\sum_{i=chan}^{c} r_{k,i} \geq \lambda,$$

then $$l_{post} = l + \left\lfloor \frac{\sum_{j=c+1}^{N} r_{k,j}}{\lambda} \right\rfloor,$$

otherwise $l_{post}$=l−1. If termination at $c_2$ does not provide sufficient rate for a user to receive l, then all the remaining sub-channels and, hence, the potential layers in $l_{pre}$ but for l−1 (already received) would contribute to its loss. The marginal loss then is ΔL(l, k, chan, c)=U(($l_{pre}$)λ)−U($l_{post}$λ).

CPS1 readily extends to the case with multiple sessions, CPSg. The allocation of sub-channels to a given layer may be coupled with the selection of a session to which the allocation must be made. Hence, the updated policy is $$[g^*, c^*] = \arg\max_{g \in [1,G], c \in [chan,N]} \frac{\sum_{k \in K} \Delta G(g, k, l_g, chan, c)}{\sum_{k \in K} \Delta G(g, k, l_g, chan, c) + \Delta L(g, k, l_g, chan, c)}.$$

At the end of every iteration 904, the terminating sub-channel c* for the next layer $l_g$* of a particular session g* is determined. When the allocation of sub-channels is considered for the next layer $l_g$ of a session g, the marginal gain and loss of users now become a function of g as shown above. The determination of the marginal gain and loss of users belonging to the considered session g is similar to the single session case. However, for users who do not belong to session g, the marginal gain would be zero and the loss would correspond to that resulting from not using sub-channels in [chan, c] alone without affecting the users' eligibility to receive subsequent layers.

There are two special cases which merit particular consideration: CP mode without channel diversity and CP mode without MRM. CPSg is still applicable in these cases.

An OFDMA frame has resources in both the time (time slots S) and frequency (sub-channels N) domains. In certain cases, it is possible for the rectangular resource region (s×n) assigned for multicast services in a frame to have fewer subchannels available for allocation than time slots (n<<s). Due to the limited number of sub-channels, allocation of resources to video layers then essentially happens in multiples of time slots, where each slot includes n sub-channels. At this granularity, the net rate of a user (summed over the n sub-channels) remains the same across time slots, thereby removing channel diversity and hence the benefits of MRM.

A set of allocable resources (slots in CP and sub-channels in DP) generically as "tiles." While different users may support different rates, the rate supported by a user does not vary across tiles. Hence, all the tiles allocated to a given layer would operate using the same rate. The scheduling problem is therefore to determine the rate of operation for a layer. This automatically determines the number of tiles needed as well as the set of users who can receive the layer. CPSg directly applies to this problem, where instead of determining the terminating sub-channel for each layer, the goal is to determine the rate of operation for each layer.

In the absence of channel diversity, users that support the same rate level will experience the same marginal gain and loss during every decision. Hence, CPSg can be simplified by categorizing users based on the rate levels they support. This allows the marginal gain and loss at every iteration to be determined only with respect to different rate level categories. If there are M rate (e.g., MCS) levels, then the complexity is reduced from K (users) to M (levels), where M<<K in practice. The simplified CPSg will have a time complexity of $O(M^2 L)$ for a single session and $O(G^2 M^2 L)$ for multiple sessions.

In addition, CPSg provides a performance guarantee of $$\left(1 - \frac{1}{e}\right)$$

for the multiple session case when there is no channel diversity. It follows from this that adapted CPSg provides a 0.63 approximation method for the multicasting problem under DP with conventional modulation and multiple sessions. This is a substantial improvement over conventional techniques.

To evaluate the relative benefits of MRM to DP and CP, it is helpful to compare the present principles to those designed for conventional modulation. A significant difference between MRM and conventional modulation in CP is that, when a set of sub-channels s is allocated to a layer in MRM, the ability of a user k to receive that layer depends on the user's net rate on those sub-channels. However, with conventional modulation, a user's ability to receive a layer not only depends on its rate on the sub-channels in s but also on those of other users who will also receive the layer. This is because the rate on each sub-channel is the minimum rate supported on that sub-channel by all users to whom the layer is to be delivered. Thus, the allocation of a subset of sub-channels to layers is also coupled with the selection of a subset of users to whom the allocation is made. This makes the scheduling problem in CP with conventional modulation significantly more complex than CP with MRM according to the present principles.

CPSg can be adapted to provide a solution for the conventional modulation case as well. This is achieved by evaluating its metric in 906 at each iteration 904 with respect to subsets of users instead of individual users, then determining a terminating sub-channel as well as a subset of users to whom a layer is to be allocated. The determination of marginal gains and losses in 906 is still computed with respect to individual users. The inherent efficiency of CPSg helps to obtain an efficient solution for conventional modulation. However, this involves an exponential number of subsets of users and is no longer polynomial in K. Nevertheless, it does provide an efficient solution for CP with conventional modulation that is used as a baseline (called CPC) to benchmark the benefits of MRM in CP.

In evaluating the performance of the present principles, DP and CP with MRM are considered. Because DP with MRM is optimally solvable for a single session case, the evaluation focuses on an exemplary system having four sessions. The performance of DPSg is compared against the optimal LP relaxation solution, which serves as an upper bound. Experiments show that DPSg performs well within 15% of the upper bound in practical scenarios. This also holds when the number of sessions is increased.

Because CP with MRM is complex even with a single session, the evaluation focuses on an exemplary system having a single session (CPS1). Using the LP relaxation upper bound, and accounting for both marginal gain and loss in allocation decisions at every iteration, CPSg yield a performance that is within 10% of the upper bound in practice. Further, it is able to keep the performance gap to within 20%, even in the multiple session case. This is especially noteworthy given the computational complexity of the scheduling problem with channel diversity.

DPSg and CPSg may be compared to one another with respect to their relative benefits as a function of increasing the number of video layers. MRM provides roughly a 10% improvement in DP mode. Increasing the number of video layers reduces the size of each layer. This allows for flexible allocation resources to multiple layers and hence increases system utility by about 15%. However, a large fraction of the gain is achieved with a smaller number of layers (about 4). Given that complexity scales with the number of layers, it is therefore advantageous to operate in DP mode with a smaller number of video layers.

In CP mode, MRM provides a significant gain over conventional modulation. This is particularly true in practical scenarios involving a small number of layers. In the presence of channel diversity the variation of user rates across sub-channels involves a larger number of tiles to deliver a layer to multiple users using conventional modulation. This degrades system performance when either the number of tiles available for allocation is small or the size of the layers to be delivered is large. Hence, MRM's ability to decouple users' rates on a sub-channel contributes to significant gains in practical cases.

Figure 10:
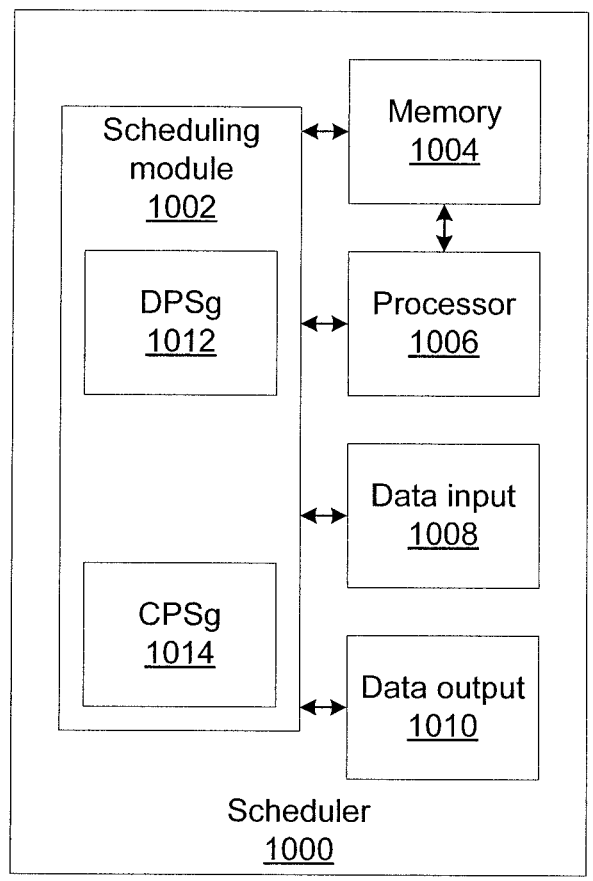
FIG. 10 is a block diagram of an exemplary scheduler according to the present principles.

Referring now to FIG. 10, an exemplary scheduler 1000 is shown. The scheduler 1000 includes a scheduling module which accepts, e.g., video data from data input 1008 and schedules that data for data output 1010. The scheduling module makes use of memory 1004 and processor 1006. The memory 1004 and processor 1006 may be included as components of the scheduling module 1002 or may exist as separate components that communicate with the scheduling module 1002. The processor 1006 is employed to perform scheduling operations that may include, for example, the DPSg 1012 and CPSg 1014 scheduling methods described above.

Having described preferred embodiments of a system and method for video multicast scheduling (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for scheduling multicast transmissions, comprising:
scheduling layered data for one or more multicast transmissions across a plurality of sub-channels using multi-resolution modulation, where the sub-channels for each respective transmission have diverse capacities, said scheduling comprising:
maximizing an overall utility function using a processor according to a utility metric that considers incremental utility gains and losses for each sub-channel allocation; and
allocating a number of sub-channels to each of a plurality of layers of the layered data according to the overall utility function,
wherein the utility metric is $$\frac{\Delta G}{\Delta G + \Delta L},$$

where $\Delta G$ is an incremental gain and $\Delta L$ is an incremental loss.

2. The method of claim 1, wherein the sub-channels for each respective transmission have diverse sub-channel modulation and coding rates.

3. The method of claim 1, wherein scheduling layered data includes iterating maximizing an overall utility function and allocating sub-channels to each of a plurality of layers in the layered data.

4. A non-transitory computer readable storage medium comprising a computer readable program, wherein the computer readable program when executed on a computer causes the computer to perform the steps of claim 1.

5. A method for scheduling multicast transmissions, comprising:
scheduling layered data for one or more multicast transmissions across a plurality of sub-channels using multi-resolution modulation, where the sub-channels for each respective transmission have uniform capacity, said scheduling comprising:
solving a linear programming relaxation of a maximization of a utility function, producing fractional allocations;
determining a session having at most two fractional allocations;
converting the fractional allocations to integral allocations; and
allocating the session,
wherein converting includes rounding the fractional allocations according to a plurality of rounding functions and selecting a rounding that results in a minimum loss.

6. The method of claim 5, wherein each of the sub-channels for each respective transmission have a uniform sub-channel modulation and coding rate.

7. The method of claim 5, wherein rounding further comprises:
selecting a session with at most two fractional allocations and either setting the session's net allocation to be integral or setting one of the session's fractional allocations to be integral; and
reassigning a set of remaining or excess sub-channels to other sessions.

8. The method of claim 5, wherein allocating includes allocating bits to sub-channels assigned to a session sequentially by multi-resolution level, beginning with a lowest multi-resolution level.

9. A non-transitory computer readable storage medium comprising a computer readable program, wherein the computer readable program when executed on a computer causes the computer to perform the steps of claim 5.

10. A multicast scheduling system, comprising:
a scheduling module configured to schedule layered data for one or more multicast transmissions across a plurality of sub-channels using multi-resolution modulation comprising:
an allocation module configured to allocate sub-channels to layers based on a utility function,
wherein the sub-channels for each respective transmission have diverse capacities and wherein the allocation module is configured to maximize an overall utility function using a processor according to a utility metric that considers incremental utility gains and losses for each sub-channel allocation and further configured to allocate a number of sub-channels to each of a plurality of layers of the layered data according to the overall utility function, and
wherein the utility metric is $$\frac{\Delta G}{\Delta G + \Delta L},$$

where $\Delta G$ is an incremental gain and $\Delta L$ is an incremental loss.

11. The multicast scheduling system of claim 10, wherein the sub-channels for each respective transmission have diverse sub-channel modulation and coding rates and the sub-channels for each respective transmission have a same average modulation and coding rate across all of the sub-channels.

12. The multicast scheduling system of claim 10, wherein the allocation module is further configured to iterate the maximization of an overall utility function and the allocation of sub-channels to each of a plurality of layers in the layered data.

13. The multicast scheduling system of claim 10, wherein the sub-channels for each respective transmission have uniform capacity and wherein the allocation module is configured to solve a linear programming relaxation of a maximization of a utility function, producing fractional allocations, to determine a session having at most two fractional allocations, to convert the fractional allocations to integral allocations, and to allocate the session.

14. The system of claim 13, wherein the allocation module is further configured to convert fractional allocations by rounding the fractional allocations according to a plurality of rounding functions and selecting a rounding that results in a minimum loss.

15. The system of claim 14, wherein the allocation module is further configured to select a session with at most two fractional allocations and either setting the session's net allocation to be integral or setting one of the session's fractional allocations to be integral and to reassign a set of remaining or excess sub-channels to other sessions.

16. The system of claim 13, wherein the allocation module is further configured to allocate bits to sub-channels assigned to a session sequentially by multi-resolution level, beginning with a lowest multi-resolution level.

* * * * *